US011502906B2

(12) United States Patent
Narayanan et al.

(10) Patent No.: US 11,502,906 B2
(45) Date of Patent: Nov. 15, 2022

(54) SYSTEM AND METHOD OF AUDIBLE NETWORK DEVICE CONFIGURATION

(71) Applicant: ARRIS Enterprises LLC, Suwanee, GA (US)

(72) Inventors: Muralidharan Narayanan, Bangalore (IN); Jalagandeswari Ganapathy, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/306,092

(22) Filed: May 3, 2021

(65) Prior Publication Data
US 2022/0070057 A1    Mar. 3, 2022

Related U.S. Application Data

(60) Provisional application No. 63/069,944, filed on Aug. 25, 2020.

(51) Int. Cl.
*G10L 15/22* (2006.01)
*G06F 3/04817* (2022.01)
(Continued)

(52) U.S. Cl.
CPC ........ H04L 41/082 (2013.01); G06F 3/04817 (2013.01); G06F 3/167 (2013.01);
(Continued)

(58) Field of Classification Search
None
See application file for complete search history.

(56) References Cited

U.S. PATENT DOCUMENTS 5,903,727 A * 5/1999 Nielsen ................. G06F 16/986
709/212
7,216,298 B1 5/2007 Ballard et al.
(Continued)

OTHER PUBLICATIONS

Chitu, "Audio Pronunciation in Google Search," Aug. 18, 2011, http://googlesystem.blogspot.com/2011/08/audio-pronunciation-in-google-search.html.*

(Continued)

*Primary Examiner* — Ryan Barrett
(74) *Attorney, Agent, or Firm* — Wenderoth, Lind & Ponack, L.L.P.

(57) ABSTRACT

A client device for use with a router and an external server. The router has a configurable feature. The external server includes an HTML file and audio files associated with the configurable feature. The client device includes a memory and a processor configured to: receive a voice command, from a user, related to the configurable feature; display on the GUI an icon indicating an HTML feature associated with the HTML file and icons indicating audio features associated with the audio files; receive a selection by the user of one of the HTML feature and the audio features; retrieve, from the external server, the HTML file when the selection corresponds to a selection of the HTML feature; display, on the GUI, the retrieved HTML file when the selection corresponds to a selection of the HTML feature; retrieve, from the external server, the audio file when the selection corresponds to a selection of the audio feature; and play, from the speaker, the retrieved audio file when the selection corresponds to the selection of the audio feature.

15 Claims, 5 Drawing Sheets

(51) Int. Cl.
  *G06F 3/16*    (2006.01)
  *G06F 3/0482*   (2013.01)
  *H04L 41/082*   (2022.01)
  *H04L 41/084*   (2022.01)
  *H04L 41/08*    (2022.01)
  *H04L 41/22*    (2022.01)

(52) U.S. Cl.
  CPC .......... *G10L 15/22* (2013.01); *H04L 41/0843* (2013.01); *H04L 41/0883* (2013.01); *H04L 41/22* (2013.01); *G06F 3/0482* (2013.01); *G10L 2015/223* (2013.01)

(56) References Cited

U.S. PATENT DOCUMENTS

| | | | |
|---|---|---|---|
| 7,257,540 B2 | 8/2007 | Ito et al. | |
| 2006/0168095 A1 | 7/2006 | Sharma et al. | |
| 2007/0038923 A1* | 2/2007 | Patel | G06F 3/167 |
| | | | 715/202 |
| 2009/0286568 A1* | 11/2009 | Cheriyath | H04L 41/0813 |
| | | | 455/552.1 |
| 2014/0040749 A1* | 2/2014 | Minear | G06F 3/167 |
| | | | 715/728 |
| 2020/0057603 A1* | 2/2020 | Sarir | G06F 21/44 |

OTHER PUBLICATIONS

Google, "What's new in Google Search," Dec. 11, 2019, https://support.google.com/websearch/answer/9673327.*

International Search Report dated Jul. 23, 2021 in International (PCT) Application No. PCT/US2021/030431.

\* cited by examiner

SYSTEM AND METHOD OF AUDIBLE NETWORK DEVICE CONFIGURATION

BACKGROUND

Embodiments of the present disclosure relate to presenting textual and spoken materials when configuring a router.

SUMMARY

Aspects of the present disclosure are drawn to a client device for use with a router and an external server. The router has a configurable feature associated with a Hypertext Markup Language (HTML) file and an audio file. The HTML file and audio file are contained in the external server. The client device includes a graphical user interface (GUI), a speaker, a memory, and a processor configured to execute instructions stored on the memory to cause the client device to: receive a voice command, from a user, related to the configurable feature; display on the GUI an icon indicating an HTML feature associated with the HTML file and an icon indicating an audio feature associated with the audio file; receive a selection by the user of one of the HTML feature and the audio feature; retrieve, from the external server, the HTML file when the selection corresponds to a selection of the HTML feature; display, on the GUI, the retrieved HTML file when the selection corresponds to a selection of the HTML feature; retrieve, from the external server, the audio file when the selection corresponds to a selection of the audio feature; and play, from the speaker, the retrieved audio file when the selection corresponds to the selection of the audio feature.

In some embodiments, the second data structure further has a second audio file associated with the configurable feature disposed therein, the audio file corresponds to a first spoken language and the second audio file corresponds to a second spoken language. In some of these embodiments, the processor is configured to cause the client device to additionally: access the second audio file from the external server; display, via the GUI, a second icon indicating a second audio feature associated with the second audio file; receive, via the GUI, a selection by the user of one of the HTML feature, the audio feature and the second audio feature; retrieve, from the external server, the second audio file when the selection corresponds to a selection of the second audio feature; and play, from the speaker, the retrieved second audio file when the selection corresponds to the selection of the second audio feature.

In some embodiments, the memory includes local language data indicating a local language associated with the client device, the second data structure further has a second audio file associated with the configurable feature disposed therein, the audio file corresponds to a first spoken language, the second audio file corresponds to a second spoken language, and the first spoken language is the same language as the local language. In some of these embodiments, the processor is configured to execute instructions stored on the memory to cause the client device to additionally: access the first audio file from the external server; receive, via the GUI, a selection by the user of one of the HTML feature and the audio feature; retrieve, from the external server, the audio file when the selection corresponds to a selection of the audio feature; and play, from the speaker, the retrieved audio file when the selection corresponds to the selection of the audio feature.

In some embodiments, the processor is configured to execute instructions stored on the memory to cause the client device to additionally; communicate with the router by way of a local wireless network; and access the HTML file and the audio file from the external server by way of the router.

In some embodiments, processor is configured to execute instructions stored on the memory to cause the client device to additionally access the HTML file and the audio file from the external server without communicating through the router.

Other aspects of the present disclosure are drawn to a method of using a client device with a router and an external server. The router has a configurable feature associated with an HTML file and an audio file. The HTML file and audio file are contained in the external server. The method includes: receiving, from a user and via a processor configured to execute instructions stored on a memory, a voice command related to the configurable feature; displaying, via the processor and on a GUI, an icon indicating an HTML feature associated with the HTML file and an icon indicating an audio feature associated with the audio file; receiving, via the GUI, a selection by the user of one of the HTML feature and the audio feature; retrieving, via the processor and from the external server, the HTML file when the selection corresponds to a selection of the HTML feature; displaying, on the GUI, the retrieved HTML file when the selection corresponds to a selection of the HTML feature; retrieving, via the processor and from the external server, the audio file when the selection corresponds to a selection of the audio feature; and playing, from the speaker, the retrieved audio file when the selection corresponds to the selection of the audio feature.

In some embodiments, the second data structure further has a second audio file associated with the configurable feature disposed therein, the audio file corresponds to a first spoken language, and the second audio file corresponds to a second spoken language. In some of these embodiments, the method further includes: accessing, via the processor, the second audio file from the external server; displaying, on the GUI, a second icon indicating an audio feature associated with the second audio file; receiving, via the GUI, a selection by the user of one of the HTML feature, the audio feature and the second audio feature; retrieving, from the external server, the second audio file when the selection corresponds to a selection of the second audio feature; and playing, from the speaker, the retrieved second audio file when the selection corresponds to the selection of the second audio feature.

In some embodiments, the memory includes local language data indicating a local language associated with the client device, the second data structure further has a second audio file associated with the configurable feature disposed therein, the audio file corresponds to a first spoken language, the second audio file corresponds to a second spoken language, and the first spoken language is the same language as the local language. In some of these embodiments, method further includes: accessing, via the processor, the first audio file from the external server; receiving, via the GUI, a selection by the user of one of the HTML feature and the audio feature; retrieving, via processor and from the external server, the audio file when the selection corresponds to a selection of the audio feature; and playing, from the speaker, the retrieved audio file when the selection corresponds to the selection of the audio feature.

In some embodiments, the method further includes: communicating, via the processor, with the router by way of a local wireless network; and accessing, via the processor, the HTML file and the audio file from the external server by way of the router.

In some embodiments, the method further includes accessing, via the processor, the HTML file and the audio file from the external server without communicating through the router.

Other aspects of the present disclosure are drawn to a non-transitory, computer-readable media having computer-readable instructions stored thereon, the computer-readable instructions being capable of being read by a client device for use with a router and an external server. The router has a configurable feature associated with an HTML file and an audio file. The HTML file and audio file are contained in the external server. The client device includes GUI, a speaker, a memory, and a processor. The computer-readable instructions are capable of instructing the client device to perform the method including: receiving, from a user and via a processor configured to execute instructions stored on a memory, a voice command related to the configurable feature; displaying, via the processor and on a GUI, an icon indicating an HTML feature associated with the HTML file and an icon indicating an audio feature associated with the audio file; receiving, via the GUI, a selection by the user of one of the HTML feature and the audio feature; retrieving, via the processor and from the external server, the HTML file when the selection corresponds to a selection of the HTML feature; displaying, on the GUI, the retrieved HTML file when the selection corresponds to a selection of the HTML feature; retrieving, via the processor and from the external server, the audio file when the selection corresponds to a selection of the audio feature; and playing, from the speaker, the retrieved audio file when the selection corresponds to the selection of the audio feature.

In some embodiments, the second data structure further has a second audio file associated with the configurable feature disposed therein, the audio file corresponds to a first spoken language, and the second audio file corresponds to a second spoken language. In some of these embodiments, the computer-readable instructions are capable of instructing the client device to perform the method that further includes: accessing, via the processor, the second audio file from the external server; displaying, on the GUI, a second icon indicating a second audio feature associated with the second audio file; receiving, via the GUI, a selection by the user of one of the HTML feature, the audio feature and the second audio feature; retrieving, from the external server, the second audio file when the selection corresponds to a selection of the second audio feature; and playing, from the speaker, the retrieved second audio file when the selection corresponds to the selection of the second audio feature.

In some embodiments, the memory includes local language data indicating a local language associated with the client device, the second data structure further has a second audio file associated with the configurable feature disposed therein, the audio file corresponds to a first spoken language, the second audio file corresponds to a second spoken language, and the first spoken language is the same language as the local language. In some of these embodiments, the computer-readable instructions are capable of instructing the client device to perform the method that further includes: accessing, via the processor, the first audio file from the external server; receiving, via the GUI, a selection by the user of one of the HTML feature and the audio feature; retrieving, via processor and from the external server, the audio file when the selection corresponds to a selection of the audio feature; and playing, from the speaker, the retrieved audio file when the selection corresponds to the selection of the audio feature.

In some embodiments, the computer-readable instructions are capable of instructing the client device to perform the method further including: communicating, via the processor, with the router by way of a local wireless network; and accessing, via the processor, the HTML file and the audio file from the external server by way of the router.

In some embodiments, the computer-readable instructions are capable of instructing the client device to perform the method further including accessing, via the processor, the HTML file and the audio file from the external server without communicating through the router.

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

Today's homes and offices often contain networks that connect client devices, such as smart phones and personal computers, to the Internet through various network devices, such as routers, modems, and wireless access points. Oftentimes, it is a homeowner or an end-user who is responsible for setting up these network devices. It is a common practice to provide the user with textual and pictorial installation and setup instructions, which may either be printed or available online. It is less common to provide voice assistance, due to various factors including the time and expense of recording spoken instructions; and the need to support local languages, dialects, and accents.

What is needed is a system and method for providing voice assistance that leverages existing textual instructions.

A system and method in accordance with the present disclosure provides voice assistance to the user from existing textual instructions.

In accordance with the present disclosure, a processor converts a textual instruction file to an audio instruction file. Multiple audio files may be created to support different languages, dialects, or accents. The user, on a client device such as a smart phone or a personal computer, selects whether to display the textual instructions or to listen to the audio instructions. A processor on the client device retrieves the appropriate file from an external server then displays the textual file or plays the audio file. The user may select and control the presentation of the file in by touching a screen or by speaking commands to pause or advance the file.

An example system and method for providing voice assistance using existing text files in accordance with aspects of the present disclosure will be described in greater detail with reference to FIGS. 1-4.

Figure 1:
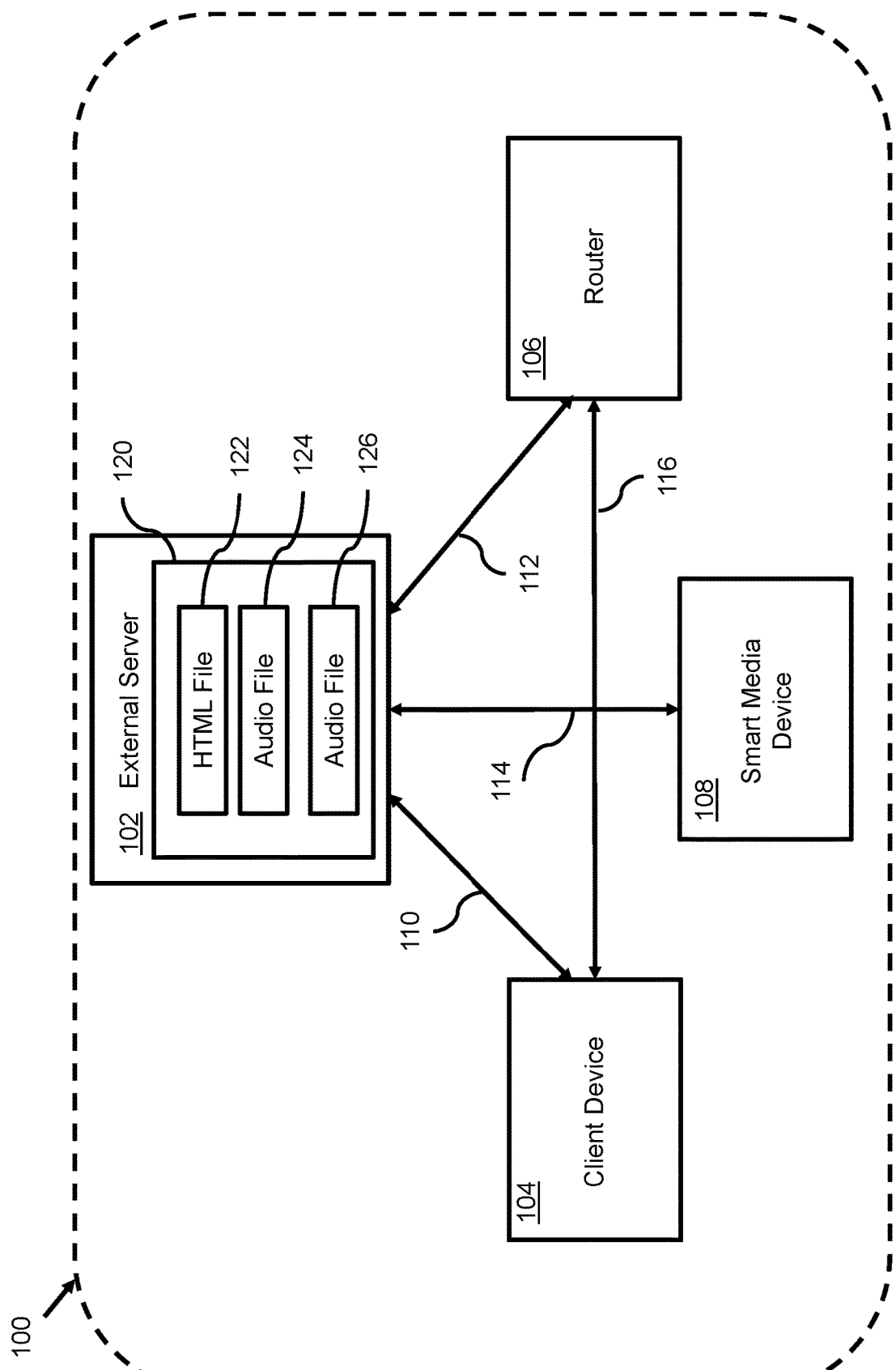
FIG. 1 illustrates a system for providing text-based and speech-based materials, in accordance with aspects of the present invention.

FIG. 1 illustrates system 100 for providing text-based and speech-based materials, in accordance with aspects of the present invention.

As shown in the figure, system 100 includes external server 102, client device 104, router 106, and smart media device 108. External server 102 contains memory 120. Memory 120 contains HTML file 122, audio file 124, and audio file 126. It should be noted that memory 120 may include a plurality of HTML files and a plurality of audio files. However, for purposes of discussion only, and for purposes of brevity, in this example embodiment, memory 120 contains a single HTML file and two audio files.

External server 102 is arranged to communicate to client device 104, router 106, and smart media device 108 by way of communications channels 110, 112, and 114, respectively. Client device 104 is arranged to communicate with router 106 by way of communication channel 116.

External server 102 may be may be a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for providing data storage and processing resources. In this non-limiting example, external server 102 is a computer that is located separately from client device 104, router 106, or smart media device 108.

Memory 120 stores instructions or data used by external server 102 and includes, but is not limited to, random access memory (RAM), dynamic random access memory (DRAM), a hard drive, a solid-state drive, read-only memory (ROM), erasable programmable-read only memory (EPROM), electrically-erasable programmable read-only memory (EEPROM), flash memory, embedded memory blocks in an FPGA, or any other various layers of memory hierarchy.

HTML file 122 is a data file containing HTML data. Audio files 124 and 126 are data files that contain audio information. In this non-limiting example, audio files 124 and 126 contain audio information using the MP3 format. Other example audio file formats include AAC, WAV, and WMA. HTML file 122, audio file 124, and audio file 126 are contained in memory 120.

Client device 104 may be a device that presents content and accepts inputs from the user. In this non-limiting example, client device 104 may be a smart phone, a tablet, or a personal computer.

Router 106 may be a device that establishes a local-area network (LAN) and connects devices in the LAN to a wide-area network (WAN). Router 106 uses various communications protocols and methods to allow devices on the LAN to access computing and storage resources on the WAN. Router 106 includes configurable features that are referenced by HTML file 122, audio file 124, and audio file 126.

Smart media device 108 may be any device or method that accepts and plays back audio data, and allows the user to interact with computing services and devices connected to external server 102. In this non-limiting example, smart media device 108 may be an Amazon Alexa device, a Google Assistant device, or an Apple Siri device.

Though client device 104 and smart media device 108 are shown as separate devices in FIG. 1, it is contemplated that client device 104 and smart media device 108 may be combined into a single device, a non-limiting example of which includes an Apple Siri-enabled smart phone.

Communications channels 110, 112, 114, and 116 may be any known wireless or wired communication channels that facilitate communications between devices or networks. Communications channels 110, 112, 114, and 116 can be implemented using any combination of wide area networks (WANs), virtual private networks (VPNs), metropolitan area networks (MANs), system area networks (SANs), local-area networks (LANs), DOCSIS networks, fiber optics networks, digital subscriber lines (DSLs), public switched data networks (PSDNs), global Telex network, 2G/3G/4G/5G networks, or Wi-Fi networks, for example.

In operation, a user who is installing or configuring router 106 may desire to consult instructions or reference material described by HTML file 122. The user may view HTML file 122 on client device 104 as a web page. Alternatively, the user may desire to hear spoken instructions, and elects to play back audio file 124 on client device 104. Alternatively, the user may desire to hear spoken instructions in a different language, and elects to play back audio file 126 on client device 104. The user may control the presentation of HTML file 122, audio file 124, or audio file 126 by interacting with client device 104 or with smart media device 108.

FIG. 1 illustrates system 100 for providing spoken assistance using existing text files. Aspects of selecting and presenting HTML files or audio files will now be discussed with reference to FIG. 2.

Figure 2:
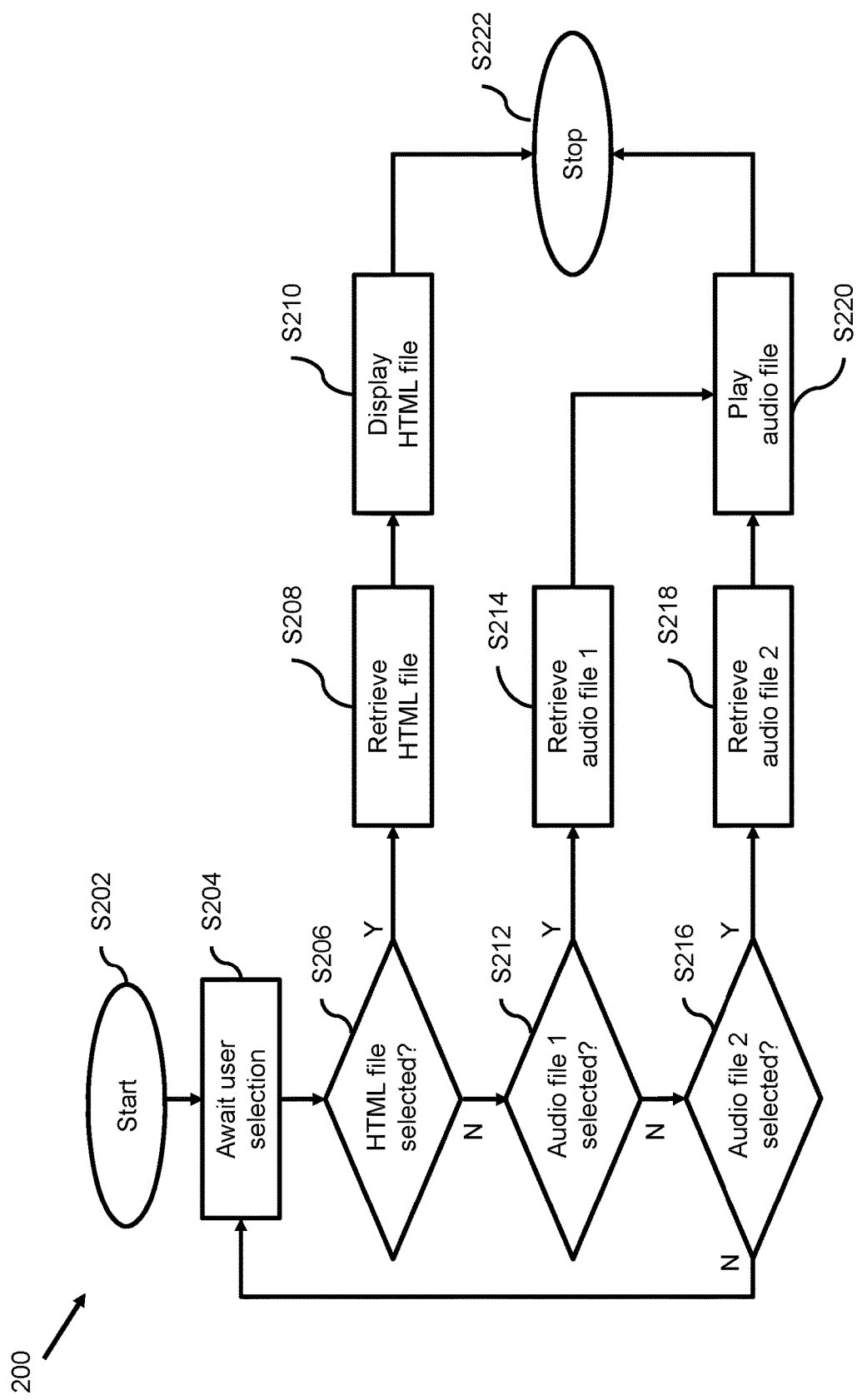
FIG. 2 illustrates a method for selecting the display of an HTML file or the playback of audio files in a client device, in accordance with aspects of the present invention.

FIG. 2 illustrates an algorithm 200 to be executed by a processor for selecting the display of HTML file 122 or the playback of audio files 124 and 126 on client device 104, in accordance with aspects of the present invention.

As shown in the figure, algorithm 200 starts (S202) and an HTML file or audio file is selected (S204). In operation, for example as shown in FIG. 1, client device 104 displays icons that are linked to HTML file 122, audio file 124, and audio file 126. In this non-limiting example, a selection is made by pressing an icon displayed on client device 104. This will be described in greater detail with reference to FIG. 3A.

Figure 3A:
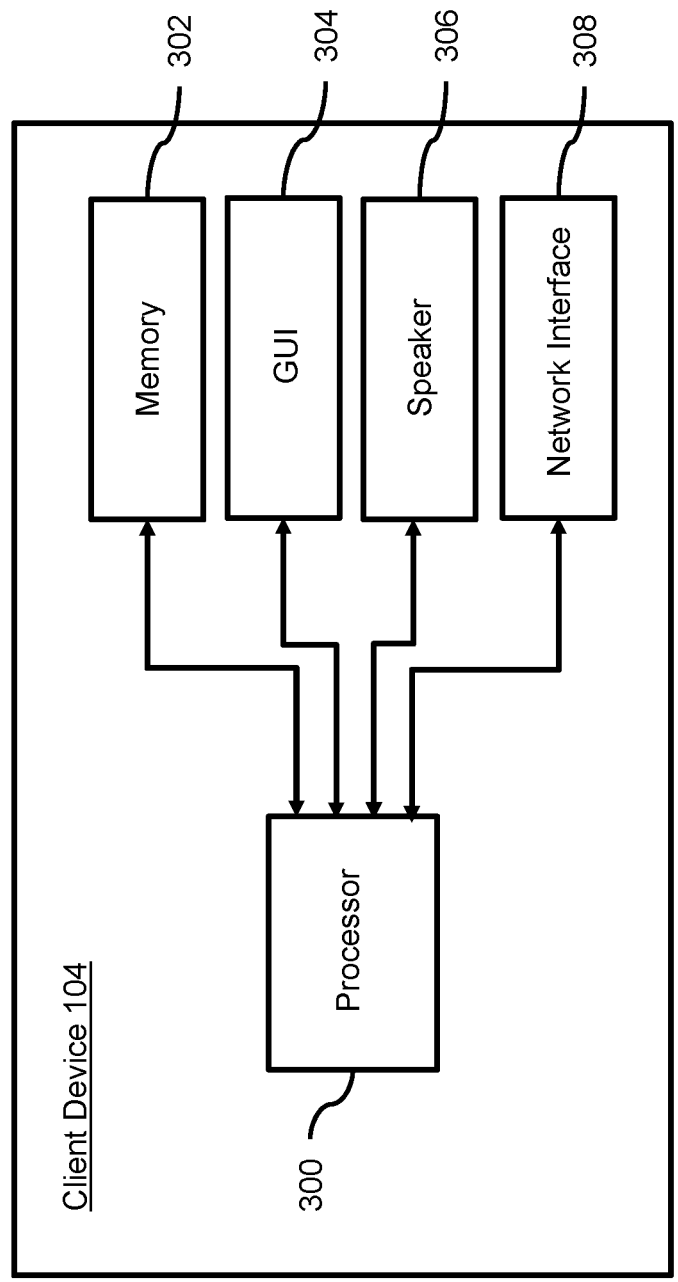
FIG. 3A illustrates an exploded view of the client device, in accordance with aspects of the present invention.

FIG. 3A illustrates an exploded view of client device 104, in accordance with aspects of the present invention.

As shown in the figure, client device 104 includes processor 300, memory 302, GUI 304, speaker 306, and network interface 308.

Processor 300 may be any device capable of controlling general operations of client device 104 and includes, but is not limited to, a central processing unit (CPU), a hardware microprocessor, a single core processor, a multi-core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 104.

Memory 302 may be any device capable of storing data and instructions used by client device 104 and includes, but is not limited to, RAM, DRAM, a hard drive, a solid-state drive, ROM, EPROM, EEPROM, flash memory, embedded memory blocks in an FPGA, or any other various layers of memory hierarchy.

In some embodiments, as will be described in greater detail below, memory 302 includes instructions that, when executed by processor 300, enable client device 104 to: receive a voice command, from a user, related to a configurable feature of router 106; access html file 122 and the audio files 124 and 126 from external server 102; display on GUI 304 an icon indicating an html feature associated with html file 122, an icon indicating an audio feature associated with audio file 124, and an icon indicating an audio feature associated with audio file 126; receive a selection by the user of one of the html feature and the two audio features; retrieve, from external server 102, html file 122 when the selection corresponds to a selection of the html feature; retrieve, from external server 102, audio file 124 when the selection corresponds to a selection of the audio feature corresponding to audio file 124; display, on GUI 304, the retrieved html file 122 when the selection corresponds to a selection of the html feature; retrieve, from external server 102, audio file 126 when the selection corresponds to a selection of the audio feature corresponding to audio file 126; play, from speaker 306, the retrieved audio file 124 when the selection corresponds to the selection of the audio feature corresponding to audio file 124; and play, from speaker 306, the retrieved audio file 126 when the selection corresponds to the selection of the audio feature corresponding to audio file 126.

In some embodiments, as will be described in greater detail below, audio file 124 is in one spoken language whereas audio file 126 is in another spoken language. In some of these embodiments, as will be described in greater detail below, memory 302 includes additional instructions that, when executed by processor 300, enable client device 104 to: access audio file 126 from external server 102; display, via GUI 304, a second icon indicating an audio feature associated with audio file 126; receive, via GUI 304, a selection by the user of one of the html feature, the audio feature associated with audio file 124, and the audio feature associated with audio file 126; retrieve, from external server 102, audio file 126 when the selection corresponds to a selection of the audio feature associated with audio file 126; and play, from speaker 306, the retrieved audio file 126 when the selection corresponds to the selection of the audio feature associated with audio file 126.

In some embodiments, as will be described in greater detail below, audio file 124 is in one spoken language whereas audio file 126 is in another spoken language. In some of these embodiments, as will be described in greater detail below, memory 302 includes local language data indicating a local language associated with client device 104 and that is the same spoken language of audio file 124 and additional instructions that, when executed by processor 300, enable client device 104 to: access audio file 124 from external server 102; display, via GUI 304, an icon indicating a second audio feature associated with audio file 124; receive, via GUI 304, a selection by the user of one of the html feature and the audio feature associated with audio file 124; retrieve, from external server 102, audio file 124 when the selection corresponds to a selection of the audio feature associated with audio file 124; and play, from speaker 306, the retrieved audio file 124 when the selection corresponds to the selection of the audio feature associated with audio file 124.

In some embodiments, as will be described in greater detail below, memory 302 includes additional instructions that, when executed by processor 300, enable client device 104 to: communicate with router 106 by way of a local wireless network; and access html file 122, audio file 126, and audio file 126 from external server 102 by way of router 106.

In some embodiments, as will be described in greater detail below, memory 302 includes additional instructions that, when executed by processor 300, enable client device 104 to: access html file 122, audio file 126, and audio file 126 from external server 102 without communicating through router 106.

GUI 304 is may be any device capable of visually presenting information on client device 104 and includes, but is not limited to, a liquid crystal display (LCD), a thin film transistor (TFT) display, a light-emitting diode (LED) display, or other similar display device, including a display device having touch screen capabilities so as to allow interaction between the user and client device 104.

Speaker 306 may be any device capable of generating audible signals on client device 104 and includes, but is not limited to, a moving coil loudspeaker, a piezoelectric loudspeaker, an electrostatic loudspeaker, a wired or wireless headphone, or a wired or wireless ear bud.

Network interface 308 may be any capable of establishing and maintaining communications channels 110 and 116 and includes, but is not limited to, a Wi-Fi radio, an Ethernet interface, a Bluetooth radio, a Zigbee radio, a cable modem, or a 2G/3G/4G/5G radio.

In this example, processor 300, memory 302, and network interface 308 are illustrated as individual devices within client device 104. However, in some embodiments, at least two of processor 300, memory 302, and network interface 308 may be combined as a unitary device. Further, in some embodiments, at least one of processor 300, memory 302, and network interface 308 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other non-transitory medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an ASIC, or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Selection of a file by way of GUI 304 will be described in greater detail with reference to FIG. 4.

Figure 4:
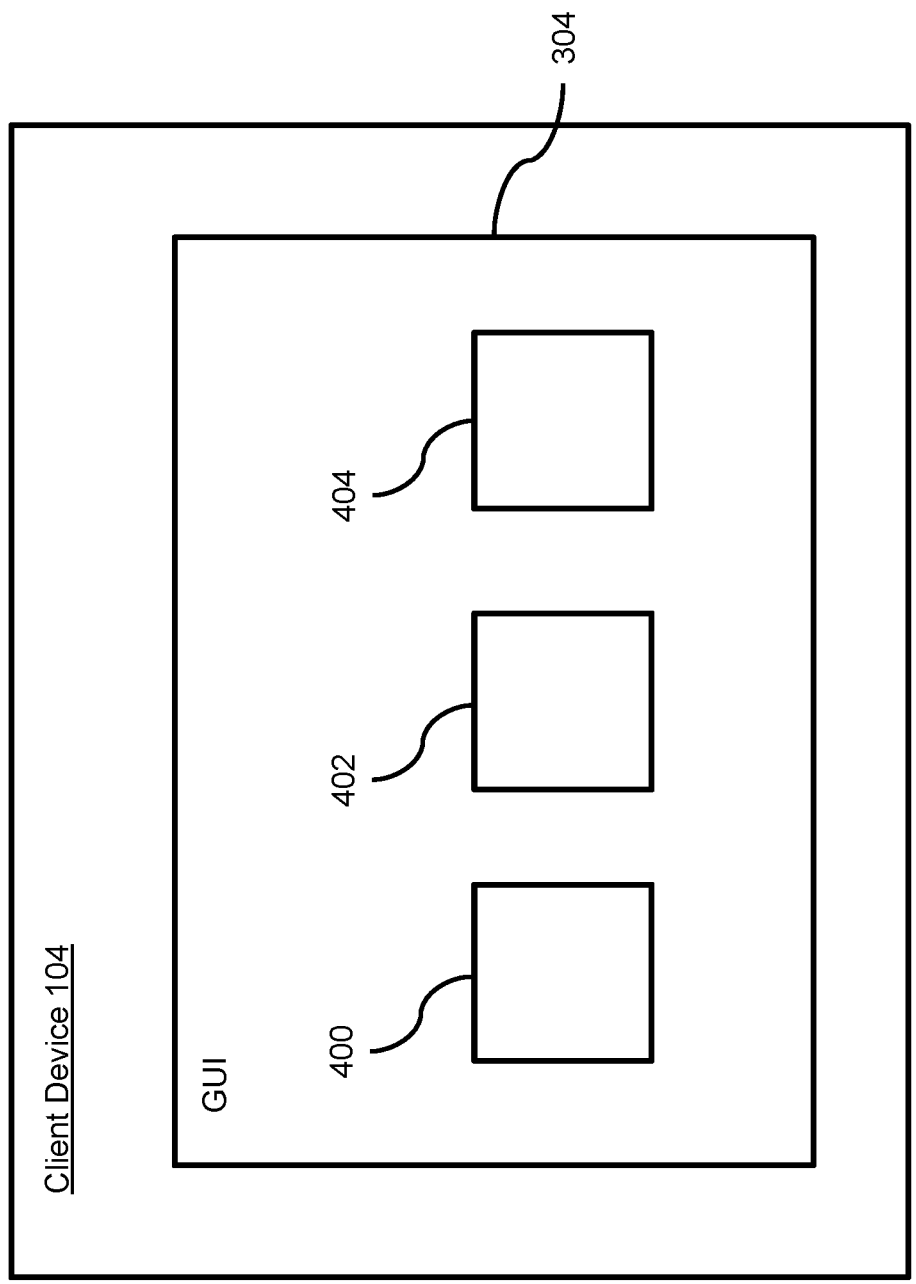
FIG. 4 illustrates an example display on the client device, in accordance with aspects of the present invention.

FIG. 4 illustrates an example display on client device 104, in accordance with aspects of the present invention.

As shown in the figure, client device 104 includes GUI 304. Icons 400, 402, and 404 are displayed on GUI 304. Icon 400 is linked to HTML file 122; icon 402 is linked to audio file 124; and icon 404 is linked to audio file 126. In this example embodiment, for purposes of discussion, let HTML file 122 contain English text; audio file 124 be in spoken English; and audio file 126 be in spoken Spanish.

In some embodiments, a selection of a file is made by speaking a command to smart media device 108.

Returning to FIG. 2, if the user selects HTML file 122 (Y on S206), then client device 104 retrieves HTML file 122 from external server 102 (S208). For example, as shown in FIG. 3A, processor 300 executes instructions from memory 302 to instruct network interface 308 to request HTML file 122 from external server 102. The request for HTML file 122 is communicated from client device 104 to external server 102 by any combination of communications channels 110, 112, or 116. This will be further described in greater detail with reference to FIG. 3B.

Figure 3B:
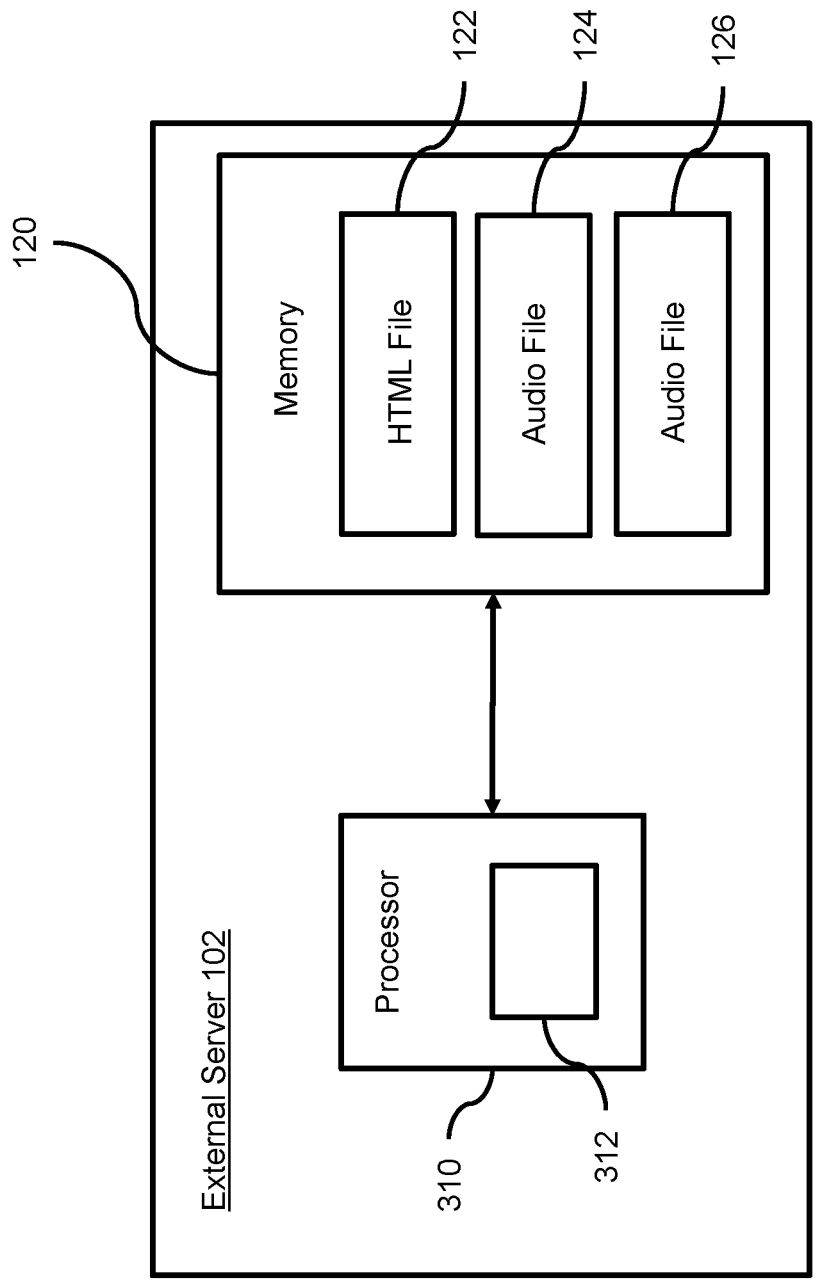
FIG. 3B illustrates an exploded view of an external server, in accordance with aspects of the present invention.

FIG. 3B illustrates an exploded view of external server 102, in accordance with aspects of the present invention.

As shown in the figure, external server includes processor 310 and memory 120. Program 312 runs on processor 310 and memory 120 contains HTML file 122, audio file 124, and audio file 126.

Processor 310 may be any capable of controlling general operations of external server 102 and includes, but is not limited to, a CPU, a hardware microprocessor, a single core processor, a multi-core processor, an FPGA, a microcontroller, an ASIC, a DSP, or other similar processing device capable of executing any type of instructions, algorithms, or software for controlling the operation and functions of external server 102.

In this example, processor 310 and memory 120 are illustrated as individual devices. However, in some embodiments, processor 310 and memory 120 may be combined as a unitary device. Further, in some embodiments, at least one of processor 310 and memory 120 may be implemented as a computer having non-transitory computer-readable media for carrying or having computer-executable instructions or data structures stored thereon.

Program 312 may be any utility or service that is configured to convert HTML file 122 into at least one of audio file 124 or audio file 126 and includes, but is not limited to, a text-to-speech (TTS) program, Amazon Polly, or Google Text-to-Speech. In this example, program 312 is shown to run on processor 310, but it is contemplated that program 312 may also be a utility external to external server 102 that is accessed as Software-as-a-Service (SaaS).

In this non-limiting example, program 312 converts HTML file 122 to audio files 124 and 126. In one embodiment, program 312 converts HTML file 122 to audio file 124 using one regional accent, e.g. American English, and to audio file 126 using another regional accent, e.g. British English. In another embodiment, program 312 converts HTML file 122 to audio file 124 in the local language determined by client device 104, e.g. English; and translates HTML file 122 into an alternate language, e.g. Spanish, then converts the resulting file into audio file 126.

In operation, when external server 102 receives the request from client device 104 for HTML file 122, processor 310 retrieves HTML file 122 from memory 120 and communicates HTML file 122 to client device 104. HTML file 122 is communicated from external server 102 to client device 104 by any combination of communications channels 110, 112, or 116.

Returning to FIG. 3A, network interface 308 receives HTML file 122 from external server 102 and provides HTML file 122 to processor 300.

Returning to FIG. 2, after the HTML file is retrieved (S208), the HTML file is displayed (S210). For example, as shown in FIG. 3A, processor 300 executes instructions from memory 302 to instruct GUI 304 to display HTML, file 122 (S210), at which point algorithm 200 stops (S222).

If the user has not selected HTML file 122 (N on S206) and has selected audio file 124 (Y on S212), then client device 104 retrieves audio file 124 from external server 102 (S214).

For example, as shown in FIG. 3A, processor 300 executes instructions from memory 302 to instruct network interface 308 to request audio file 124 from external server 102. The request for audio file 124 is communicated from client device 104 to external server 102 by any combination of communications channels 110, 112, or 116.

As shown in FIG. 3B, when external server 102 receives the request from client device 104 for audio file 124, processor 310 retrieves audio file 124 from memory 120 and communicates audio file 124 to client device 104. Audio file 124 is communicated from external server 102 to client device 104 by any combination of communications channels 110, 112, or 116.

Returning to FIG. 2, after audio file 124 is retrieved (S214), the audio file is played (S220). For example, as shown in FIG. 3A, processor 300 executes instructions from memory 302 to instruct speaker 306 to play audio file 124 (S220), at which point algorithm 200 stops (S222).

Returning to FIG. 2, if the user has not selected audio file 124 (N on S212) and has selected audio file 126 (Y on S216), then client device 104 retrieves audio file 126 from external server 102 (S218).

For example, as shown in FIG. 3A, processor 300 executes instructions from memory 302 to instruct network interface 308 to request audio file 126 from external server 102. The request for audio file 126 is communicated from client device 104 to external server 102 by any combination of communications channels 110, 112, or 116.

As shown in FIG. 3B, when external server 102 receives the request from client device 104 for audio file 126, processor 310 retrieves audio file 126 from memory 120 and communicates audio file 126 to client device 104. Audio file 126 is communicated from external server 102 to client device 104 by any combination of communications channels 110, 112, or 116.

Returning to FIG. 2, after audio file 126 is retrieved (S218), the audio file is played (S220). For example, as shown in FIG. 3A, processor 300 executes instructions from memory 302 to instruct speaker 306 to play audio file 126 (S220), at which point algorithm 200 stops (S222).

Returning to FIG. 2, if the user has not selected HTML file 122 or audio files 124 or 126 (N on S216), then client device 104 continues to wait for a user input (S204). It should be noted that in some embodiments, wherein more than two audio files are provided, that the operation of selecting an $n^{th}$ audio file will be provided (similar to S216). However for purposes of brevity only, a discussion is now provided for only two audio file options.

In this non-limiting example embodiment, if the user desires to read the English text, then the user presses icon 400 on GUI 304 (Y on S206). HTML file 122 is retrieved from external server 102 (S208) and displayed on GUI 304 (S210). However, if the user desires to listen to the English audio, then the user presses icon 402 on GUI 304 (Y on S212). Audio file 124 is retrieved from external server 102 (S214) and played on speaker 306 (S220). Further, if the user desires to listen to the Spanish audio, then the user presses icon 404 on GUI 304 (Y on S216). Audio file 126 is retrieved from external server 102 (S214) and played on speaker 306 (S220).

In this example embodiment, the user makes a selection by pressing icons 400, 402, or 404 on GUI 304. As mentioned previously, in other embodiments, the user may make a selection by speaking commands through smart media device 108.

It should be noted that in some embodiments, GUI 304 of client device 104 will only provide icons for audio files that correspond to the local language. For example, consider for purposes of discussion only, the situation where client device 104 is located in Germany and memory 302 includes local language information indicating that the local language is German. In some embodiments, a user may enter the local language information into memory 302 by known processes, such as by answering a question "What is the local language," when prompted during a registration of a new phone. In such a situation where client device 104 has German indicated as the local language, then processor 300 may automatically choose only audio files from external server 102 that are in German for selection by the user. In this way, they user may not be burdened with identifying the correct audio file to download.

Network devices are often set up or configured by users, such as homeowners, who are not professionally trained to perform the configuration steps. The user may desire to consult step-by-step instructions or other reference materials. Typically, these instructions and reference materials are provided in textual documents. The user may desire to listen to spoken material instead of reading; for example, the user's attention may be focused on router buttons and it is not convenient to shift attention to another device. However, spoken material, particularly in multiple languages, may not be present because of the time and expense of recording separate audio files.

In accordance with the present disclosure, a utility converts an HTML file to an audio file in one language. The utility may convert the HTML file to other audio files using other languages, dialects, or accents. A user uses a client device to select among available HTML files and audio files. The selected HTML file or audio file is retrieved from an external server, and displayed or played back on the client device. Thus, the present disclosure provides audio files related to configuration of the router by generating them from an existing HTML file.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A client device for use with a router, and an external server, the router having a configurable feature, the external server including a first data structure having an HTML file associated with the configurable feature disposed therein and a second data structure having an audio file associated with the configurable feature disposed therein, said client device comprising:
 a memory;
 a graphic user interface (GUI);
 a speaker; and
 a processor configured to execute instructions stored on said memory to cause said client device to:
  receive a voice command, from a user, related to the configurable feature;
  display on the GUI an HTML icon indicating an HTML feature associated with the HTML file and an audio icon indicating an audio feature associated with the audio file;

receive a selection by the user of one of the HTML icon and the audio icon;

retrieve, from the external server, the HTML file when the selection corresponds to a selection of the HTML icon;

display, on said GUI, the retrieved HTML file when the selection corresponds to a selection of the HTML icon;

retrieve, from the external server, the audio file when the selection corresponds to a selection of the audio icon; and play, from said speaker, the retrieved audio file when the selection corresponds to the selection of the audio icon.

2. The client device of claim 1, wherein the second data structure further has a second audio file associated with the configurable feature disposed therein, wherein the audio file corresponds to a first spoken language, wherein the second audio file corresponds to a second spoken language, and wherein said processor is configured to execute instructions stored on said memory to cause said client device to additionally:

access the second audio file from the external server;

display, via said GUI, a second audio icon indicating a second audio feature associated with the second audio file;

receive, via said GUI, a selection by the user of one of the HTML icon, the audio icon and the second audio icon;

retrieve, from the external server, the second audio file when the selection corresponds to a selection of the second audio icon; and play, from said speaker, the retrieved second audio file when the selection corresponds to the selection of the second audio icon.

3. The client device of claim 1, wherein said memory includes local language data indicating a local language associated with said client device, and wherein the second data structure further has a second audio file associated with the configurable feature disposed therein, wherein the audio file corresponds to a first spoken language, wherein the second audio file corresponds to a second spoken language, wherein the first spoken language is the same language as the local language, wherein said processor is configured to execute instructions stored on said memory to cause said client device to additionally:

access the audio file from the external server;

receive, via said GUI, a selection by the user of one of the HTML icon and the audio icon;

retrieve, from the external server, the audio file when the selection corresponds to a selection of the audio icon; and play, from said speaker, the retrieved audio file when the selection corresponds to the selection of the audio icon.

4. The client device of claim 1, wherein said processor is configured to execute instructions stored on said memory to cause said client device to additionally:

communicate with the router by way of a local wireless network; and access the HTML file and the audio file from the external server by way of the router.

5. The client device of claim 1, wherein said processor is configured to execute instructions stored on said memory to cause said client device to additionally:

access the HTML file and the audio file from the external server without communicating through the router.

6. A method of using a client device with a router, and an external server, the router having a configurable feature, the external server including a first data structure having an HTML file associated with the configurable feature disposed therein and a second data structure having an audio file associated with the configurable feature disposed therein, said method comprising:

receiving, from a user and via a processor configured to execute instructions stored on a memory, a voice command related to the configurable feature;

displaying, via the processor and on a GUI, an HTML icon indicating an HTML feature associated with the HTML file and an audio icon indicating an audio feature associated with the audio file;

receiving, via the GUI, a selection by the user of one of the HTML icon and the audio icon;

retrieving, via the processor and from the external server, the HTML file when the selection corresponds to a selection of the HTML icon;

displaying, on the GUI, the retrieved HTML file when the selection corresponds to a selection of the HTML icon;

retrieving, via the processor and from the external server, the audio file when the selection corresponds to a selection of the audio icon; and playing, from the speaker, the retrieved audio file when the selection corresponds to the selection of the audio icon.

7. The method of claim 6, wherein the second data structure further has a second audio file associated with the configurable feature disposed therein, wherein the audio file corresponds to a first spoken language, wherein the second audio file corresponds to a second spoken language, and wherein said method further comprises:

accessing, via the processor, the second audio file from the external server;

displaying, on the GUI, a second audio icon indicating an audio feature associated with the second audio file;

receiving, via the GUI, a selection by the user of one of the HTML icon, the audio icon and the second audio icon;

retrieving, from the external server, the second audio file when the selection corresponds to a selection of the second audio icon; and playing, from the speaker, the retrieved second audio file when the selection corresponds to the selection of the second audio icon.

8. The method of claim 6, wherein the memory includes local language data indicating a local language associated with the client device, wherein the second data structure further has a second audio file associated with the configurable feature disposed therein, wherein the audio file corresponds to a first spoken language, wherein the second audio file corresponds to a second spoken language, wherein the first spoken language is the same language as the local language, and wherein the method further comprises:

accessing, via the processor, the audio file from the external server;

receiving, via the GUI, a selection by the user of one of the HTML icon and the audio icon;

retrieving, via processor and from the external server, the audio file when the selection corresponds to a selection of the audio icon; and playing, from the speaker, the retrieved audio file when the selection corresponds to the selection of the audio icon.

9. The method of claim 6, further comprising:

communicating, via the processor, with the router by way of a local wireless network; and accessing, via the processor, the HTML file and the audio file from the external server by way of the router.

10. The method of claim 6, further comprising:

accessing, via the processor, the HTML file and the audio file from the external server without communicating through the router.

11. A non-transitory, computer-readable media having computer-readable instructions stored thereon, the computer-readable instructions being capable of being read by a client device for use with a router, and an external server, the router having a configurable feature, the external server including a first data structure having an HTML file associated with the configurable feature disposed therein and a second data structure having an audio file associated with the configurable feature disposed therein, wherein the computer-readable instructions are capable of instructing the client device to perform the method comprising:

receiving, from a user and via a processor configured to execute instructions stored on a memory, a voice command related to the configurable feature;

displaying, via the processor and on a GUI, an HTML icon indicating an HTML feature associated with the HTML file and an audio icon indicating an audio feature associated with the audio file;

receiving, via the GUI, a selection by the user of one of the HTML icon and the audio icon;

retrieving, via the processor and from the external server, the HTML file when the selection corresponds to a selection of the HTML icon;

displaying, on the GUI, the retrieved HTML file when the selection corresponds to a selection of the HTML icon;

retrieving, via the processor and from the external server, the audio file when the selection corresponds to a selection of the audio icon; and playing, from the speaker, the retrieved audio file when the selection corresponds to the selection of the audio icon.

12. The non-transitory, computer-readable media of claim 11, wherein the second data structure further has a second audio file associated with the configurable feature disposed therein, wherein the audio file corresponds to a first spoken language, wherein the second audio file corresponds to a second spoken language, and wherein the computer-readable instructions are capable of instructing the client device to perform the method further comprising:

accessing, via the processor, the second audio file from the external server;

displaying, on the GUI, a second audio icon indicating a second audio feature associated with the second audio file;

receiving, via the GUI, a selection by the user of one of the HTML icon, the audio icon and the second audio icon;

retrieving, from the external server, the second audio file when the selection corresponds to a selection of the second audio icon; and playing, from the speaker, the retrieved second audio file when the selection corresponds to the selection of the second audio icon.

13. The non-transitory, computer-readable media of claim 11, wherein the memory includes local language data indicating a local language associated with the client device, wherein the second data structure further has a second audio file associated with the configurable feature disposed therein, wherein the audio file corresponds to a first spoken language, wherein the second audio file corresponds to a second spoken language, and wherein the first spoken language is the same language as the local language, wherein the computer-readable instructions are capable of instructing the client device to perform the method further comprising:

accessing, via the processor, the audio file from the external server;

receiving, via the GUI, a selection by the user of one of the HTML icon and the audio icon;

retrieving, via processor and from the external server, the audio file when the selection corresponds to a selection of the audio icon; and playing, from the speaker, the retrieved audio file when the selection corresponds to the selection of the audio icon.

14. The non-transitory, computer-readable media claim 11, wherein the computer-readable instructions are capable of instructing the client device to perform the method further comprising:

communicating, via the processor, with the router by way of a local wireless network; and accessing, via the processor, the HTML file and the audio file from the external server by way of the router.

15. The non-transitory, computer-readable media of claim 11, wherein the computer-readable instructions are capable of instructing the client device to perform the method further comprising accessing, via the processor, the HTML file and the audio file from the external server without communicating through the router.

* * * * *